United States Patent
Amirzadeh-Asl

(10) Patent No.: US 7,749,320 B2
(45) Date of Patent: Jul. 6, 2010

(54) METHOD FOR PRODUCING INORGANIC SOLID SUBSTANCES IN THE FORM OF FINE COATED PARTICLES AND THE USE THEREOF

(75) Inventor: Djamschid Amirzadeh-Asl, Moers (DE)

(73) Assignee: Sachtleben Chemie GmbH, Duisburg (DE)

( * ) Notice: Subject to any disclaimer, the term of this patent is extended or adjusted under 35 U.S.C. 154(b) by 1037 days.

(21) Appl. No.: 10/568,306

(22) PCT Filed: Aug. 20, 2004

(86) PCT No.: PCT/EP2004/009324

§ 371 (c)(1),
(2), (4) Date: Jun. 2, 2006

(87) PCT Pub. No.: WO2005/021632

PCT Pub. Date: Mar. 10, 2005

(65) Prior Publication Data

US 2007/0122331 A1    May 31, 2007

(30) Foreign Application Priority Data

Aug. 21, 2003    (DE) ................................ 103 38 929

(51) Int. Cl.
*C09C 1/04*    (2006.01)

(52) U.S. Cl. .................. 106/419; 106/420; 106/425; 106/426; 106/427; 106/429; 106/431; 106/453; 106/461

(58) Field of Classification Search ................ 106/419, 106/420, 425, 426, 427, 429, 431, 453, 461
See application file for complete search history.

(56) References Cited

U.S. PATENT DOCUMENTS 4,029,513 A    6/1977    Vessey et al.
5,143,965 A    9/1992    Mertz

FOREIGN PATENT DOCUMENTS

DE    26 46 965 A    4/1977
DE    100 05 685 A    8/2001
WO    WO-03/074615 A    9/2006

*Primary Examiner*—Edward J Cain
(74) *Attorney, Agent, or Firm*—Fulbright & Jaworski, L.L.

(57) ABSTRACT

A process for the production of finely particulate, inorganic solids by precipitation of the finely particulate inorganic solids from solution is described, in which the surface of the inorganic solids particles is covered (coated) with at least one additive, in which the additive(s) contains a dispersing agent or deflocculating agent, in which the proportion of the additives is overall at most 80 wt. %, preferably at most 40 wt. % or 30 wt. % and particularly preferably at most 15 wt. % of the coated solids, and wherein the additive(s) is added to the starting solution or solutions. Uses of the inorganic solids produced according to the invention are also described.

42 Claims, No Drawings

METHOD FOR PRODUCING INORGANIC SOLID SUBSTANCES IN THE FORM OF FINE COATED PARTICLES AND THE USE THEREOF

This is a §371 of PCT/EP2004/009324 filed Aug. 20, 2004 which claims priority from German Patent Application No. 103 38 929.6 filed Aug. 21, 2003.

The present invention relates to a process for the production of coated, finely particulate inorganic solids as well as to their use.

Inorganic solids (e.g. inorganic pigments or fillers) are incorporated inter alia as functional additives in the form of powders or dispersions into synthetic polymers, lacquers, colorants (e.g. printing inks and powder coatings), fibres, paper (e.g. laminated paper), adhesives, ceramics (e.g. electrical ceramics and magnetic ceramics), enamels, adsorption agents, ion exchangers, grinding and polishing agents, coolant-lubricants and coolant-lubricant concentrates, refractory products, hard concrete substances, catalysts, medicinal products and cosmetics (e.g. powders, ointments, toothpastes). In order that the inorganic solids can exhibit their desired properties in these fields of application, a very good and uniform distribution of the finely particulate inorganic solids in the respective system is desired. Such a uniform distribution is absolutely essential particularly for incorporation into polymers as well as lacquers and colorants. However, the presence of the inorganic solids in highly dispersed form is also desired in other fields of application. In this connection the particles of the solids should as far as possible be present not in agglomerated form but in monodispersed form.

In order to improve the processing properties of the finely particulate inorganic solids, it has been proposed in DE 198 39 856 A1 to embed these in a matrix of an organic carrier material. The pulverulent intermediate product formed thereby consists of individual particles of size <1 µm. Such a particle in turn contains a plurality of individual inorganic solids particles that are embedded in the organic matrix. A disadvantage of these additives is the relatively high content of organic carrier material and the relatively costly and complicated process for the production of these additives.

In DE 100 05 685 A1 it is proposed to cover finely particulate barium sulfate with an organic substance, in which each individual barium sulfate particle is coated with a layer of organic substance. For this, the filter cake of barium sulfate can be processed into a paste, with which the organic substance is mixed. The mixture is then dried. A process variant envisages drying the filter cake of barium sulfate and then adding the organic substance. Both processes have the disadvantage that the distribution of the organic substance on the barium sulfate particles is not uniform. In a further process variant it is proposed to resuspend the filter cake of barium sulfate in water, add the organic substance, and then dry the mixture. Although this process does provide a better distribution of the organic substance on the barium sulfate particles, the disadvantage however is the relatively large amount of water that is required to produce the suspension and that subsequently has to be removed.

The production of suspensions of finely particulate oxidic compounds starting from powders and pastes is proposed in Offenlegungsschrift DE 19907703 A1. For this, agglomerates of metal oxides and oxidic compounds are comminuted wet in an agitator ball mill in the presence of specific dispersing agents. On account of the wet comminution process that has taken place and the resultant modification of the particles surfaces, the suspensions thereby produced have mean secondary particle diameters of less than 0.1 µm. A serious disadvantage of this process is that the employed starting substances, being in powder or paste form, contain many agglomerates and aggregates and therefore have to be recomminuted, which requires high energy input and complicated wet grinding in the presence of organic additives.

The object of the invention is to obviate the disadvantages of the prior art and provide a process by means of which finely particulate inorganic solids can be modified in a simple and economic way with organic substances and the thereby modified finely particulate inorganic solids are present in the form of a suspension or paste or as a powder and can be incorporated without any problem as additives in various systems (e.g. polymers, lacquers, colorants, paper, ceramics, catalysts, medicinal products or cosmetic products). In particular the organic substance should be distributed uniformly over the surface of the inorganic solids so that individual particles are not present in an agglomerated or aggregated state.

This object is achieved by a process for the production of finely particulate, inorganic solids by precipitation of the finely particulate, inorganic solids from solution, in which the surface of the inorganic solids particles is covered (coated) with at least one additive, in which the additive(s) contains a dispersing agent or deflocculating agent, in which the proportion of the additives overall is at most 80 wt. %, preferably at most 40 wt. % or 30 wt. % and particularly preferably at most 15 wt. % of the coated solids, and in which the additive(s) is added to the starting solution or solutions.

The precipitation may be carried out for example by the combined addition of at least two starting solutions. The precipitation may also be carried out by introducing gas into a starting solution or by a so-called hydrothermal treatment of a starting solution. Hydrothermal treatment denotes the heating of an aqueous solution or suspension or dispersion in a closed vessel, optionally under pressure (see also Ullmanns Enzyklopädie der Technischen Chemie, 4$^{th}$ Edition, 1978, Vol. 15, pp. 117 ff: K. Recker, Einkristallzüchtung [Growing Single Crystals]).

Members of the following groups of substances are preferably used as finely particulate, inorganic solids:

metal oxides and/or metal hydroxides, such as e.g. titanium dioxide, hydrated titanium oxide, zinc oxide/hydroxide, iron oxides/hydroxides, magnesium oxide/hydroxide, silicon dioxide/hydroxide, aluminium oxide/hydroxide, zirconium oxide/hydroxide, antimony oxide, chromium oxide;

metal carbonates and/or metal hydrogen carbonates, such as e.g. precipitated calcium carbonate, barium carbonate, lithium carbonate, strontium carbonate;

metal nitrates, metal halides;

metal sulfates, such as e.g. barium sulfate, precipitated calcium sulfate;

metal sulfides, such as e.g. zinc sulfide, cadmium sulfide, iron sulfide, tin sulfide;

metal phosphates and/or metal hydrogen phosphates, such as e.g. zinc phosphate, aluminium phosphate, aluminium hydrogen phosphate, titanium phosphate, silicon aluminium phosphate;

metal titanates, such as e.g. barium titanate, strontium titanate, calcium titanate, nickel titanate, lithium titanate;

metal ferrites, such as e.g. barium ferrite, manganese ferrite, nickel ferrite;

mixed oxides with spinel structure, such as e.g. spinel green (Co, Ni, Zn)$_2$TiO$_4$, zinc/iron brown (ZnFe$_2$O$_4$)

synthetic compounds of hydrotalcite structure;

zirconates, silicates, aluminates, vanadates, chromates, molybdates, borates;

compounds of all the aforementioned classes of substances in undoped or doped form, individually or as a mixture.

The inorganic parent substances may be precipitated so that they are in turn provided with an inorganic "coating". The additive (dispersing agent or deflocculating agent) then lies on the surface of such "mixed substances".

The term dispersing agent or deflocculating agent is understood here to denote a surface-active substance that facilitates the dispersion (=distribution) of a pulverulent substance in a liquid medium, in which the surface tension between two oppositely charged components is lowered by reversing the electrical charge of the surface. The agglomerates that are present are thereby destroyed during the dispersion procedure, with the result that a re-agglomeration or flocculation is prevented.

As dispersing agent or deflocculating agent (hereinafter termed only dispersing agent) there may be used ionogenic as well as non-ionogenic dispersing agents. The following substances may preferably be used: alkali metal (in particular Na and K) salts or ammonium salts of organic acids (e.g. salts of poly(meth)acrylic acid), alkali metal salts or ammonium salts of acrylate copolymers or methacrylate copolymers (with a preferred molecular weight of up to 15,000), polyphosphates (inorganic or organic polyphosphates, e.g. potassium tetrapolyphosphate, poly(meth)acrylate phosphates, aliphatic polyether phosphates), generally poly(meth)acrylates, polyethers, anionically modified polyethers, fatty alcohol polyglycol ethers, modified polyurethanes, non-ionic, modified fatty acid derivatives or anion-active aliphatic esters.

The amount of the dispersing agent that is added depends on the mean particle size of the inorganic solids. The finer the inorganic solids particles, the larger the amount of dispersing agent that is added. The added amount of dispersing agent is at most 80 wt. % and is preferably 0.01 to 40 wt. %, particularly preferably 0.01 to 30 wt. % and most particularly preferably 0.1 to 20 wt. %, referred to the finished, coated product.

In addition to the dispersing agent a second additive, namely an organic additive, is preferably added.

The second, organic additive preferably contains one or more of the following substances: carboxylic acids, soaps, metal soaps, alcohols (e.g. 1,1,1-trimethylolpropane, di-trimethylolpropane, methylpropanediol, butylethylpropanediol, cyclotrimethylolpropane, trimethylpropane dialkyl ether), pentaerythritol, neopentyl glycol, polyalcohols (e.g. neopentyl glycol propoxylates, pentaerythritol ethoxylates), polyglycols (e.g. polyethylene glycol), polyethylene glycol ethers, organic esters (e.g. neopentyl glycol dibenzoate), silanes, siloxanes, silicone oils, organic sulfones of the formula $RSO_2R$, organic ketones (R—(C=O)—R), organic nitriles (RCN), organic sulfoxides ($R_2$—$SO_2$), organic sulfonic acids (e.g. toluenesulfonic acid), alkali salts and ammonium salts of organic sulfonic acids (e.g. ammonium salt of p-toluenesulfonic acid), organic amides (R—(C=O)—$NR^1R$ (e.g. polyhydroxycarboxylic acid amides) or R—(S=O)—$ONR^1R$) organic amines (e.g. triethanolamine), alkali salts or ammonium salts of organic phosphoric acid esters (e.g. alkylolammonium salts of acidic phosphoric acid esters), fatty acid esters or fatty acid amides.

The amount of the second, organic additive that is added also depends on the mean particle size of the inorganic solids. The finer the inorganic solids particles, the larger the added amount of the second organic additive. The added amount of the second organic additive is preferably 0.01 to 60 wt. %, particularly preferably 0.01 to 40 wt. % and most particularly preferably 0.1 to 20 wt. %, referred to the finished, coated product.

The dispersing agent and optionally the second, organic additive may be added to one of the starting solutions, or alternatively the dispersing agent and the second organic additive are in each case added to different starting solutions.

The precipitation of the inorganic solids themselves may be carried out by all known methods, such as e.g. precipitation in a vessel equipped with a stirrer, in a precipitation cell, in a T or Y mixer, in a microreactor or in a microjet reactor (under normal pressure or under elevated pressure). The precipitation may be performed continuously or discontinuously.

Normally a supersaturation distribution in the reaction space occurs during a precipitation reaction, e.g. on addition and (intensive) mixing of the starting solutions. This leads to the formation and to the growth of particles, which in a known way can agglomerate to form larger units. By means of the procedure according to the invention the inorganic particles that are formed are surface-stabilised in situ in the presence of at least one additive (dispersing agent), preferably in the presence of a dispersing agent and a second, organic additive, whereby the undesired interaction of the individual inorganic particles is interrupted. The rate of the agglomerate formation is significantly reduced and a further growth of the particles is prevented. The precipitated particles are surface-stabilised in an outstanding way by the process according to the invention.

In a preferred implementation of the invention, during the precipitation of the inorganic solids a defoaming agent is added as further (e.g. third) additive, in order to avoid any undesirable foam formation that may occur. The amount of the defoaming agent that is added depends on the nature of the inorganic solids and on the nature and amount of the employed dispersing agent and optionally of the second organic additive. The added amount of defoaming agent may be up to 10 wt. %, as a rule 0.001 to 5 wt. %, preferably 0.001 to 3 wt. % and most particularly preferably 0.001 to 1.5 wt. %, in each case referred to the solids content of the suspension.

The coated finely particulate inorganic solids produced by the process according to the invention may, after conventional working-up of the precipitated suspension (according to the prior art), be present as a finely particulate suspension, as a slurry, as a paste or, after washing (it necessary), drying and optionally grinding, as a powder. It is also possible to treat the powder under an oxidising or reducing atmosphere after drying at temperatures of up to 1500° C. The thus treated product may then undergo grinding.

"Normally" the coated, finely particulate inorganic solids have a mean grain size $d_{50}$ of 0.1 μm to 50 μm, preferably 0.1 to 10 μm, particularly preferably 0.2 μm to 5 μm and most particularly preferably 0.2 to 3 μm.

Depending on the adjustment of the precipitation parameters (such as concentration of the starting solution(s), metering rate, stirring intensity, temperature, pressure, pH value, residence time) the inorganic solids can also be produced as coated nanoparticles, which can be used in the aforementioned forms for a multiplicity of applications. In order to obtain particle sizes as small as possible, a purposefully low concentration of the starting solution(s), a short residence time and a low temperature are for example chosen. The particles obtained may be crystalline or amorphous. Preferably the particle size (primary particle size, crystallite size) of the nanoscale, coated, finely particulate inorganic solids is <200 nm, particularly preferably 1 to 120 nm and most particularly preferably 1 to 80 nm (crystallites measured by means of transmission electron microscopy).

Overall, the maximum added amount of the additives (dispersing agent and possibly second, organic additive and possibly further additives) is up to 80 wt. %, referred to the finished coated product. A total added amount of additives in the range of up to 80 wt. % is preferred in the case where the inorganic solids are nanoparticles, i.e. the crystallite size is at most 200 nm. A total added amount of additives in the range from 1 to 40 wt. % is most particularly preferred in the case of nanoparticles.

The nanoparticles of inorganic solids have in some cases greatly altered and new (desired) properties compared to inorganic solids of conventional particle size. In this connection it is necessary that the individual particles be present not in agglomerated form and that they be optimally distributed during the further processing in various fields of application. This is achieved with the process according to the invention.

A further advantage of the process according to the invention is that the coated, finely particulate inorganic solids obtained in the form of a powder have an excellent flowability and can be pneumatically conveyed extremely easily. On account of these properties they can be metered extremely well for addition to polymer melts, lacquers and colorants, and other products. If the coated, finely particulate inorganic solids are in turn to be processed further as a suspension or slurry, they can be processed without a large dispersing effort to form aqueous and also non-aqueous (based on solvent) "liquid" dispersions with a very high solids content, for example 10 to 80 wt. %, preferably 20 to 75 wt. % and most particularly preferably 40 to 70 wt. %. For certain applications (e.g. incorporation into lacquers and colorants) a very high solids concentration is particularly desired, for example a solids content of 50 to 80 wt. % or even 60 to 80 wt. %. Such concentrations can be adjusted without any problem. In addition it was found that such suspensions have a good storage stability, and in the event of a settling of solid material can very easily be redispersed. Accordingly, no agglomeration of the particles takes place.

Should an undesired foam formation occur during the production of such a suspension (dispersion in water or in an organic solvent), the foam formation can be suppressed also in this process step by the addition of a defoaming agent. The amount of the defoaming agent that is added depends on the nature of the inorganic solids and the nature and amount of the employed dispersing agent and possibly of the second, organic additive. The added amount may be up to 10 wt. %, but as a rule is below 5 wt. %, in each case referred to the solids content of the suspension.

The coated, finely particulate, inorganic solids produced by the process according to the invention may for example be used in plastics, particularly in polymer production (e.g. thermoplastic or thermosetting polymers), in lacquers, colorants (e.g. printing inks or powder coatings), fibres, paper (e.g. laminated paper), adhesives, ceramics (e.g. electrical and magnetic ceramics), enamels, adsorption agents, ion exchangers, grinding and polishing agents, coolant-lubricants and coolant-lubricant concentrates, refractory products, hard concrete substances, medicinal products (sunscreens), cosmetics (e.g. powders, ointments, toothpastes), in catalysis, in electronics and nanoelectronics, optoelectronics, nanophotonics, batteries and fuel cells.

The invention claimed is:

1. A process comprising precipitating finely particulate, inorganic solids from solution, wherein the surfaces of the finely particulate, inorganic solids are coated with at least one additive containing at least one of a dispersing agent or a deflocculating agent to coated finely particulate, inorganic solids, wherein the proportion of the at least one additive is at most 80 wt. % of the coated finely particulate, inorganic solids, wherein the at least one additive is added to the starting solution, wherein the finely particulate, inorganic solid is selected from the group consisting of antimony oxide, chromium oxide, a metal nitrate, a metal halide, nickel titanate, lithium titanate, a metal ferrite, barium ferrite, manganese ferrite, nickel ferrite, a mixed oxide with a spinel structure, spinel green $(Co,Ni,Zn)_2TiO_4$, zinc/iron brown $(ZnFe_2O_4)$, a molybdate and a borate.

2. The process according to claim 1, wherein the proportion of the additives is overall at most 40 wt. %.

3. The process according to claim 1, wherein the proportion of the additives is overall at most 30 wt. %.

4. The process according to claim 1, wherein the precipitation is carried out by combined addition of at least two starting solutions or by passing gas into a starting solution or by a hydrothermal treatment of a starting solution.

5. A process comprising precipitating finely particulate, inorganic solids from solution, wherein the surfaces of the finely particulate, inorganic solids are coated with at least one additive containing at least one of a dispersing agent or a deflocculating agent to coated finely particulate, inorganic solids, wherein the proportion of the at least one additive is at most 80 wt. % of the coated finely particulate, inorganic solids, wherein the at least one additive is added to the starting solution, wherein the finely particulate, inorganic solid is selected from the group consisting of antimony oxide, chromium oxide, a metal nitrate, a metal halide, nickel titanate, lithium titanate, a metal ferrite, barium ferrite, manganese ferrite, nickel ferrite, a mixed oxide with a spinel structure, spinel green $(Co,Ni,Zn)_2TiO_4$, zinc/iron brown $(ZnFe_2O_4)$, a molybdate, a borate, a compound of all the aforementioned substances and classes of substances in undoped or doped form, or a mixture thereof.

6. A process according to claim 5, wherein the dispersing agent or deflocculating agent comprises at least one member selected from the group consisting of an alkali metal salt of an organic acid, an ammonium salt of an organic acid, an alkali metal salt or ammonium salt of an acrylate copolymer, a methacrylate copolymer, a polyphosphate, a poly(meth)acrylate, a polyether, an anionically modified polyether, a fatty alcohol polyglycol ether, a modified polyurethane, a nonionic, modified fatty acid derivative and an anion-active aliphatic ester.

7. A process according to claim 1, wherein the amount of the dispersing agent or deflocculating agent added is 0.01 to 40 wt. %, based on the finished coated product.

8. A process according to claim 7, wherein the added amount of the dispersing agent or deflocculating agent added is 0.01 to 30 wt. %, referring to the finely particulate, inorganic solids.

9. A process according to claim 5, comprising adding a second organic additive.

10. A process according to claim 9, wherein the second organic additive comprises at least one member selected from the group consisting of a carboxylic acid, a soap, a metal soap, an alcohol, pentaerythritol, neopentyl glycol, a polyalcohol, a polyglycol, a polyethylene glycol ether, an organic ester, an organic sulfonic acid, an alkali salt of an organic sulfonic acid, an ammonium salt of an organic sulfonic acid, an organic amide, an organic amine, an alkali salt of an organic phophoric acid ester, an ammonium salt of organic phosphoric acid ester, a fatty acid ester, an a fatty acid amide.

11. A process according to claim 9, wherein the added amount of the second, organic additive is 0.01 to 60 wt. %, referred to the finished coated product.

12. A process according to claim 11, wherein the added amount of the second, organic additive is 0.01 to 40 wt. %, referring to the finely particulate, inorganic solids.

13. A process according to claim 12, wherein the added amount of the second, organic additive is 0.1 to 20 wt. %, referring to the coated finely particulate, inorganic solids.

14. A process comprising precipitating finely particulate, particulate inorganic solid particles from solution, wherein the surfaces of the finely particulate, inorganic solids are coated with at least one additive containing at least one of a dispersing agent or a deflocculating agent to form coated solid particles, and wherein the proportion of the at least one additive is at most 80 wt. % of the coated solid, and wherein the at least one additive is added to the starting solution, comprising adding a defoaming agent during precipitation.

15. A process according to claim 14, wherein the added amount of the defoaming agent is up to 10 wt. %.

16. A process according to claim 14, wherein the added amount of the defoaming agent is up to 0.01 to 5 wt. %.

17. A process according to claim 14, wherein the coated solid particles have a mean grain size $d_{50}$ of 0.1 to 50 μm.

18. A process according to claim 16, wherein the coated solid particles have a mean grain size $d_{50}$ of 0.1 to 10 μm.

19. A process according to claim 16, wherein the coated solid particles have a mean grain size $d_{50}$ of 0.2 to 5 μm.

20. A process comprising precipitating fine particulate inorganic solid from solution, wherein the surface of the inorganic solid particle is coated with at least one additive containing at least one of a dispersing agent or a deflocculating agent to form a coated solid, wherein the proportion of the at least one additive is at most 80 wt. % of the coated solid, and wherein the at least one additive is added to the starting solution, and wherein the coated, finely particulate, inorganic solids have a mean crystallite size of <200 nm.

21. A process comprising precipitating fine particulate inorganic solid from solution, wherein the surface of the inorganic solid particle is coated with at least one additive containing at least one of a dispersing agent or a deflocculating agent to form a coated solid, wherein the proportion of the at least one additive is at most 80 wt. % of the coated solid, and wherein the at least one additive is added to the starting solution, and wherein the coated, finely particulate, inorganic solids have a mean crystallite size of 1 to 120 nm.

22. A process comprising precipitating fine particulate inorganic solid from solution, wherein the surface of the inorganic solid particle is coated with at least one additive containing at least one of a dispersing agent or a deflocculating agent to form a coated solid, wherein the proportion of the at least one additive is at most 80 wt. % of the coated solid, wherein the at least one additive is added to the starting solution, and wherein the coated, finely particulate, inorganic solids have a mean crystallite size of 1 to 80 nm.

23. The process according to claim 9, wherein the proportion of the additives is overall at most 40 wt. %.

24. The process according to claim 23, wherein the proportion of the additives is overall at most 30 wt. %.

25. The process according to claim 5, wherein the precipitation is carried out by combined addition of at least two starting solutions or by passing gas into a starting solution or by a hydrothermal treatment of a starting solution.

26. A process according to claim 7, wherein the dispersing agent or deflocculating agent comprises at least one member selected from the group consisting of an alkali metal salt of an organic acid, an ammonium salt of an organic acid, an alkali metal salt or ammonium salt of an acrylate copolymer, a methacrylate copolymer, a polyphosphate, a poly(meth)acrylate, a polyether, an anionically modified polyether, a fatty alcohol polyglycol ether, a modified polyurethane, a non-ionic, modified fatty acid derivative and an anion-active aliphatic ester.

27. A process according to claim 9, wherein the added amount of the dispersing agent or deflocculating agent is 0.01 to 40 wt. %, referring to the coated finely particulate, inorganic solids.

28. A process according to claim 27, wherein the added amount of the dispersing agent or deflocculating agent is 0.01 to 30 wt. %, referring to the finely particulate, inorganic solids.

29. A process according to claim 6, comprising adding a second organic additive.

30. A process according to claim 29, wherein the second organic additive comprises at least one member selected from the group consisting of a carboxylic acid, a soap, a metal soap, an alcohol, pentaerythritol, neopentyl glycol, a polyalcohol, a polyglycol, a polyethylene glycol ether, an organic ester, an organic sulfonic acid, an alkali salt of an organic sulfonic acid, an ammonium salt of an organic sulfonic acid, an organic amide, an organic amine, an alkali salt of an organic phophoric acid ester, an ammonium salt of organic phosphoric acid ester, a fatty acid ester, an a fatty acid amide.

31. A process according to claim 30, wherein the added amount of the second, organic additive is 0.01 to 60 wt. %, referring to the coated finely particulate, inorganic solids.

32. A process according to claim 31, wherein the added amount of the second organic additive is 0.01 to 40 wt. %, referring to the coated finely particulate, inorganic solids.

33. A process according to claim 32, wherein the added amount of the second organic additive is 0.1 to 20 wt. %, referring to the finely particulate, inorganic solids.

34. A process according to claim 20, further comprising adding a defoaming agent during precipitation.

35. A process according to claim 34, wherein the added amount of the defoaming agent is up to 10 wt. %.

36. A process according to claim 34, wherein the added amount of the defoaming agent is up to 0.01 to 5 wt. %.

37. A process according to claim 10, wherein the coated finely particulate, inorganic solids have a mean grain size $d_{50}$ of 0.1 to 50 μm.

38. A process according to claim 36, wherein the coated, finely particulate, inorganic solids have a mean grain size $d_{50}$ of 0.1 to 10 μm.

39. A process according to claim 36, wherein the coated, finely particulate, inorganic solids have a mean grain size $d_{50}$ of 0.2 to 5 μm.

40. A process comprising precipitating finely particulate, inorganic solids from solution, wherein the surfaces of the finely inorganic solids are coated with at least one additive containing at least one of a dispersing agent or a deflocculating agent to form coated solids, wherein the proportion of the at least one additive is at most 80 wt. % of the coated solids, wherein the at least one additive is added to the starting solution wherein the finely particulate, inorganic solid comprise at least one member selected from the group consisting of titanium dioxide, hydrated titanium oxide, zinc oxide, zinc hydroxide, iron oxide, iron hydroxide, magnesium oxide, silicon dioxide, silicon hydroxide, aluminum oxide, aluminum hydroxide, zirconium oxide, zirconium hydroxide; antimony oxide, chromium oxide, a metal carbonate, a metal hydrogen carbonate, a metal nitrate, a metal halide, a metal sulfate, a metal sulfide, a metal phosphate, a metal hydrogen phosphate, a metal titanate, a metal ferrite, a mixed oxide with spinel structure, a synthetic compound of a hydrotalcite structure; a zirconate, a silicate, an aluminate, a vanadate, a chromate, a molybdate, a borate, or a mixture thereof, wherein the particulate, inorganic solid may be doped or undoped, wherein the coated, finely particulate, inorganic solids have a mean crystallite size of <200 nm.

41. A process comprising precipitating finely particulate, inorganic solids from solution, wherein the surfaces of the finely particle, inorganic solids are coated with at least one additive containing at least one of a dispersing agent or a deflocculating agent to form coated solids, wherein the proportion of the at least one additive is at most 80 wt. % of the coated solids, wherein the at least one additive is added to the starting solution wherein the finely particulate, inorganic solids comprise at least one member selected from the group consisting of titanium dioxide, hydrated titanium oxide, zinc oxide, zinc hydroxide, iron oxide, iron hydroxide, magnesium oxide, silicon dioxide, silicon hydroxide, aluminum oxide, aluminum hydroxide, zirconium oxide, zirconium hydroxide; antimony oxide, chromium oxide, a metal carbonate, a metal hydrogen carbonate, a metal nitrate, a metal halide, a metal sulfate, a metal sulfide, a metal phosphate, a metal hydrogen phosphate, a metal titanate, a metal ferrite, a mixed oxide with spinel structure, a synthetic compound of a hydrotalcite structure; a zirconate, a silicate, an aluminate, a vanadate, a chromate, a molybdate, a borate, or a mixture thereof, wherein the particulate, inorganic solid may be doped or undoped, wherein the coated, finely particulate, inorganic solids have a mean crystallite size of 1 to 120 nm.

42. A process comprising precipitating finely particulate, inorganic solids from solution, wherein the surfaces of the finely particle, inorganic solids comprise at least one additive containing at least one of a dispersing agent or a deflocculating agent to form coated solids, wherein the proportion of the at least one additive is at most 80 wt. % of the coated solid, wherein the at least one additive is added to the starting solution wherein the particulate, inorganic solid is at least one member selected from the group consisting of titanium dioxide, hydrated titanium oxide, zinc oxide, zinc hydroxide, iron oxide, iron hydroxide, magnesium oxide, silicon dioxide, silicon hydroxide, aluminum oxide, aluminum hydroxide, zirconium oxide, zirconium hydroxide; antimony oxide, chromium oxide, a metal carbonate, a metal hydrogen carbonate, a metal nitrate, a metal halide, a metal sulfate, a metal sulfide, a metal phosphate, a metal hydrogen phosphate, a metal titanate, a metal ferrite, a mixed oxide with spinel structure, a synthetic compound of a hydrotalcite structure; a zirconate, a silicate, an aluminate, a vanadate, a chromate, a molybdate, a borate, or a mixture thereof, wherein the particulate, inorganic solid may be doped or undoped, wherein the coated, finely particulate, inorganic solids have a mean crystallite size of 1 to 80 nm.

* * * * *